United States Patent

Keiser, Jr.

[15] 3,641,668
[45] Feb. 15, 1972

[54] GRASS SHEARS

[72] Inventor: David Howard Keiser, Jr., 53 Park Road, Wyomissing Hills, Pa. 19610

[22] Filed: Sept. 30, 1969

[21] Appl. No.: 862,303

[52] U.S. Cl. ...................................................... 30/260
[51] Int. Cl. ............................................... B26b 13/04
[58] Field of Search .................. 30/228, 248, 247, 250, 260, 30/353

[56] References Cited

UNITED STATES PATENTS

| | | | |
|---|---|---|---|
| 2,287,347 | 6/1942 | Gillen | 30/228 |
| 2,333,740 | 11/1943 | Rasmussen | 30/260 |
| 2,607,114 | 8/1952 | Keiser | 30/248 |
| 3,327,390 | 6/1967 | Smith | 30/248 |
| 3,421,218 | 1/1969 | Thompson | 30/353 X |

Primary Examiner—Theron E. Condon
Assistant Examiner—J. C. Peters
Attorney—William J. Ruano

[57] ABSTRACT

Grass shears and the like in which one of the blades is of rectangular cross section and is disposed substantially at right angles to the other blade so as to provide four different corners that selectively serve as cutting edges. The last-mentioned blade is pivotally movable and is detachably secured to a blade carrier so as to enable the blade to be selectively positioned in a manner for use of any one of said four edges as the cutting edge and thereby provide four times the life of the blade.

1 Claims, 4 Drawing Figures

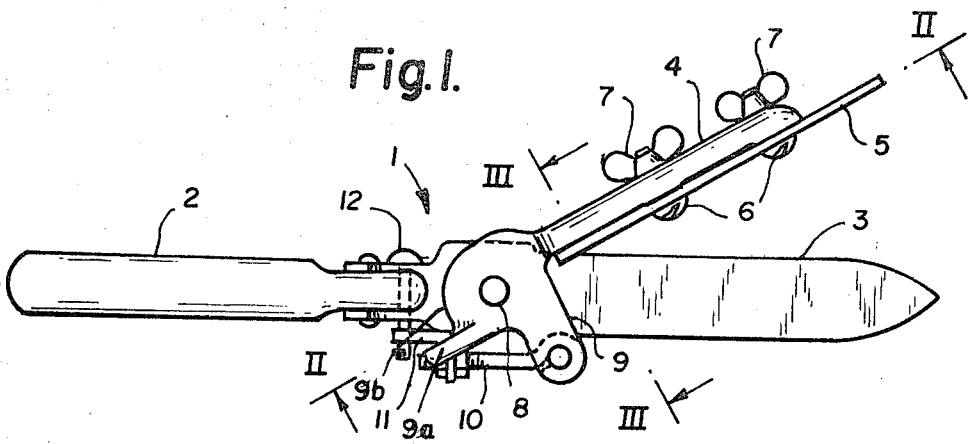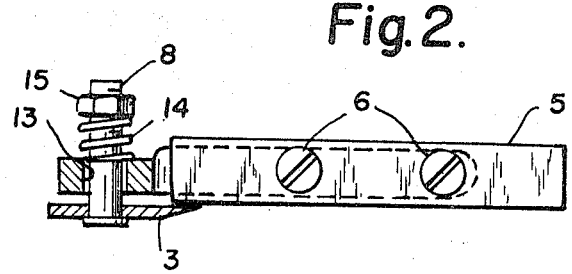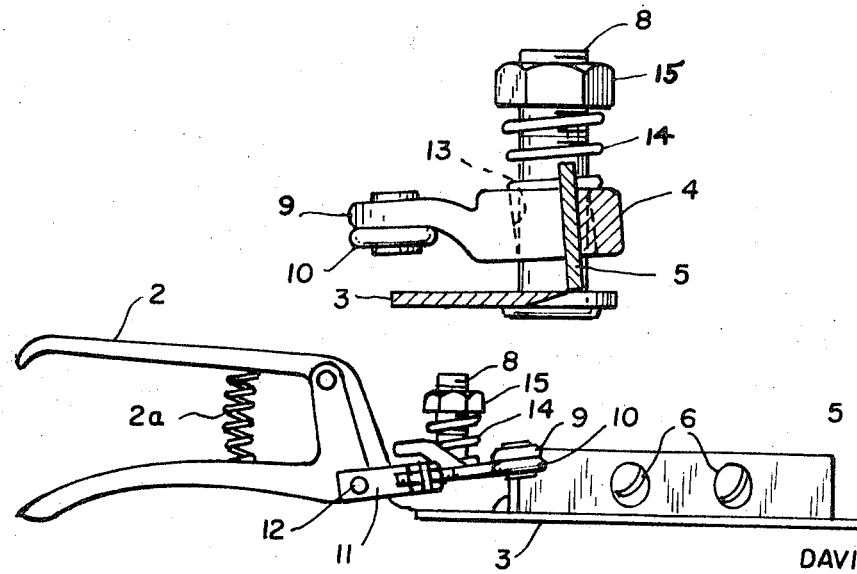

GRASS SHEARS

This invention relates generally to grass or hedge shears, although it is useful for shears generally.

An outstanding disadvantage of conventional grass shears has been that only one cutting edge is provided on the movable blade which requires frequent sharpening, therefore requires substantial time and expense for maintenance of the shears.

Attempts have been made in the past to overcome this objection by detachably securing the movable blade to a blade carrier so that it could be replaced when the blade becomes dull. However, this has not solved the problem since shears become dull after a relatively short time when used frequently, thereby making such blade replacement expensive.

An object of the present invention is to overcome the above-named disadvantages of conventional grass shears.

A more specific object of the invention is to provide grass shears with a novel construction of a removable blade which enables such blade to be used in four different cutting positions, thus extending the ordinary life of the blade four fold.

A more specific object of the invention is to provide grass shears having a stationary blade and a movable blade carrier for supporting a movable blade, of rectangular cross section, at substantially right angles to the stationary blade and wherein detachable fastening means are provided on the blade carrier to enable selective mounting of the movable blade in four different positions to allow selective use of any one of the four edges of the movable blade.

Other objects and advantages will become more apparent from a study of the following description, taken with the accompanying drawing wherein:

FIG. 1 is a top or plan view of grass shears embodying the principles of my invention;

FIG. 2 is a cross-sectional view taken along line II—II of FIG. 1;

FIG. 3 is a cross-sectional view taken along line III—III of FIG. 1; and

FIG. 4 is a side view.

Referring more particularly to FIG. 1 of the drawing, numeral 1 generally denotes grass shears having a stationary handle 2 integrally secured to a laterally offset stationary blade 3 having a cutting edge along the upper portion as viewed in FIG. 1. Immediately below stationary handle 2 there is a movable handle (not shown) normally biased away from handle 2 by a spring (not shown) whereby upon grasping and moving the movable handle toward the stationary handle 2 lever 12 is pivotally moved to the left, as viewed in FIG. 1, so as to pull angle element 11 to the left as well as the eyebolt 10 which, in turn, will rotate lever 9 about stud 8 as the center. Such operating mechanism is illustrated in my earlier U.S. Pat. Nos. 2,661,534, and 2,281,977.

Lever 9 is integrally secured to the movable blade carrier 4 which extends substantially at right angles or at right angles to lever 9. An integral stop element 9a will limit the pivotal movement of the carrier 4 by engagement with the stationary handle 2.

Referring more particularly to FIGS. 2 and 3 of the drawing, a movable blade 5 is provided which is of rectangular cross section (see FIG. 3) and which is of substantially rectangular outline as shown in FIG. 2. Blade 5 is provided with a pair of holes through which extend the shanks of bolts 6 for detachably securing blade 5 to the carrier 4 by means of wingnuts 7. Ordinary nuts or other suitable fastening means may be used instead.

The stud 8, as shown in FIG. 2, extends through hole 13 and is encircled by a helical spring 14 which tends to hold lever 9 downwardly against the end or cutting portion of blade 3, particularly along the perimetrical portion 9b of lever 9 which projects downwardly against the surface of the stationary blade 3. This provides a slight tipping of the movable blade 5 (see FIG. 3) as it is moved from the open position shown in FIG. 1 to the closed position in substantial alignment with stationary blade 3. As the movable blade 5 progressively moves from the open to the closed position, there will be provided a point of contact between blades 5 and 3 which point will progressively move outwardly from the point of contact shown in FIG. 1 to one which moves out to the extremities of blades 5 and 3 to provide minimum frictional resistance as a consequence of the cutting and return movements of the blades.

As shown more clearly in FIG. 3, the movable blade 5 is disposed slightly less than 90° relative to stationary blade 3 during the cutting movement. The lower left corner of blade 5, as viewed in FIG. 3, serves as the cutting edge. When such edge is worn out, it is necessary simply to reverse the movable blade 5 to present the lower right-hand corner shown in FIG. 3, instead, as the cutting edge. When this edge becomes dull, blade 5 may be detached and inverted so that either of the top corners will serve as the cutting edge. There are four different positions for mounting movable blade 5 so that any one of the four corners will serve as a cutting edge, thus giving four times the life of the movable blade.

Furthermore, in view of the rectangular shaped cross section of movable blade 5, it is relatively easy to sharpen the corners merely by rubbing the two flat surfaces which form the cutting edge on an abrasive flat surface, to restore the sharpness of the cutting edge.

Thus it will be seen that I have provided a novel and efficient grass shears or hedge shears, or the like, in which the movable blade is disposed at right angles, or substantially at right angles, to the stationary blade and is of rectangular cross section and detachably mounted on a movable blade carrier, whereby the blade may be selectively mounted in any one of four different positions to selectively use any one of the four corners of the blade as the cutting edge and thereby provide four times the life of the movable blade and the shears; furthermore, I have provided a novel shear construction which has very little resistance to cutting movements, therefore which enables grass cutting with minimum effort and facility so as to avoid fatigue by the user.

While I have illustrated and described a single specific embodiment of my invention, it will be understood that this is by way of illustration only, and that various changes and modifications may be made within the contemplation of my invention and within the scope of the following claims.

I claim:

1. Shears comprising a pair of blades movable relatively in scissorslike motion, the plane of one of said blades being slightly less than 90° with respect to the plane of the other blade, a pivotally mounted blade carrier for detachably mounting said one of said blades so that selective edges thereof may be used as the cutting edge, said blade carrier being integral with a lever having a central pivot hole through which projects a stud integrally secured to the other of said blades, which lever has an arcuate portion which projects towards and makes contact with the base of the other of said blades during cutting movement so as to provide a point of contact between the blades which progressively moves outwardly of the blades as a consequence of progressive cutting movement of the blades.

* * * * *